(12) United States Patent
Si

(10) Patent No.: US 8,427,746 B2
(45) Date of Patent: Apr. 23, 2013

(54) STEREOSCOPIC IMAGE DISPLAY SYSTEM AND METHOD OF CONTROLLING THE SAME

(75) Inventor: Bingyu Si, KunShan (CN)

(73) Assignee: Infovision Optoelectronics (Kunshan) Co. Ltd., Kunshan (CN)

( * ) Notice: Subject to any disclaimer, the term of this patent is extended or adjusted under 35 U.S.C. 154(b) by 370 days.

(21) Appl. No.: 12/838,153

(22) Filed: Jul. 16, 2010

(65) Prior Publication Data
US 2011/0248911 A1    Oct. 13, 2011

(30) Foreign Application Priority Data
Apr. 7, 2010    (CN) .......................... 2010 1 0141601

(51) Int. Cl.
*G09G 5/00*    (2006.01)

(52) U.S. Cl.
USPC .......... 359/462; 359/467; 359/463; 359/464; 359/465; 359/466; 359/468; 359/469; 359/470; 359/471; 359/472; 359/473; 359/474; 359/475; 359/476; 359/477; 348/42; 348/43; 348/44; 348/45; 348/46; 348/47; 348/48; 348/49; 348/50; 348/51; 348/52; 348/53; 348/54; 348/55; 348/56; 348/57; 348/58; 348/59; 348/60; 349/15; 353/7; 353/8; 353/9; 345/4; 345/5; 345/6

(58) Field of Classification Search .......... 359/462–477; 348/42–60; 349/15; 353/7–9; 345/4–6
See application file for complete search history.

(56) References Cited

U.S. PATENT DOCUMENTS

| | | | | |
|---|---|---|---|---|
| 6,040,807 | A * | 3/2000 | Hamagishi et al. | 345/6 |
| 6,288,741 | B1 * | 9/2001 | Alejo Trevijano | 348/42 |
| 7,385,653 | B2 * | 6/2008 | Kim et al. | 349/61 |
| 2002/0015007 | A1 * | 2/2002 | Perlin et al. | 345/6 |
| 2002/0075384 | A1 * | 6/2002 | Harman | 348/43 |
| 2011/0149019 | A1 * | 6/2011 | Kellerman et al. | 348/42 |

* cited by examiner

*Primary Examiner* — Alexander S Beck
*Assistant Examiner* — Jeffrey Steinberg
(74) *Attorney, Agent, or Firm* — Sand & Sebolt

(57) ABSTRACT

The present invention discloses a stereoscopic image display system and a method of controlling the same. An eye tracking module locates current 3D spatial positions of the viewer's eyes, and generates the information of both left and right eyes' current 3D spatial positions. A control module controls a display device that can alter the direction of the light outputted, and outputs images on the display device in time multiplex mode. The light containing the left eye image is outputted to the position of left eye instead of right eye at one time point, and the light containing the right eye image is outputted to the position of right eye instead of left eye at another time point, so that a stereoscopic image is perceived according to the parallax theory. The present invention enlarges the visual range of stereoscopic image and achieves a better stereoscopic image visual experience for viewers.

18 Claims, 3 Drawing Sheets

STEREOSCOPIC IMAGE DISPLAY SYSTEM AND METHOD OF CONTROLLING THE SAME

CROSS REFERENCE TO RELATED APPLICATION

This application claims the benefit of priority from Chinese Patent Application No. 201010141601.6 filed on Apr. 7, 2010, the entire content of which is hereby incorporated by reference.

FIELD OF THE INVENTION

The present invention relates to three-dimensional (3D) stereoscopic display technique, and more particularly to a stereoscopic image display system and a method of controlling the same.

BACKGROUND

It is well known that the real world, a 3D world, provides people two position-shifted images through their eyes, which images form an optical parallax required for 3D viewing after entering the eyes, and then generate a 3D perception under fusion reflection of optic nerve center and visuopsychic reaction.

People desire more and more for the technique of displaying more real images as development of high-definition TV (HDTV) technique in recent years. The left and right position-shifted images are provided to the left and right eyes respectively through a display screen based on this 3D imaging theory, so as to generate a 3D perception.

It has already developed 3D display techniques such as 3D glasses and HMD (Head Mounted Display). However, the aforementioned 3D display techniques such as wearing 3D glasses or HMD may cause discomfort to viewer's eyes, and decrease the comfort level of watching. Therefore, an auto stereoscopic display technique, i.e. naked eye visual autostereoscopic image display technique becomes a focus for display technique researches.

SUMMARY

Accordingly, one aspect of the present invention is to provide a stereoscopic image display system, which includes an eye tracking module, a control module, a backlight module and a display module. More specifically, the eye-tracking module is used for locating current 3D spatial positions of viewer's eyes and generating the information of 3D spatial positions of both left and right eyes; the control module is used for controlling the backlight module and the display module synchronously according to the information of 3D spatial positions of the both left and right eyes provided by the eye tracking module; the backlight module is used for forming an interleaved light source under the control of the control module and emitting the interleaved light source to the display module as a backlight source, the interleaved light source includes luminous regions where light emits to the display module and non-luminous regions where hardly any light emits to the display module, and the luminous regions and non-luminous regions are arrayed in an interleaved form; and the display module is used for displaying an interleaved image under the control of the control module, the interleaved image includes black regions where light can't pass through and image regions where light can pass through, and the black regions and image regions are arrayed in an interleaved form.

Another aspect of the present invention is to provide a method for controlling a stereoscopic image display system, which comprises: an eye-tracking module locating current 3D spatial positions of viewer's eyes, and generating the information of 3D spatial positions of both left and right eyes; a control module controlling a display device that can alter the direction of the light outputted, and outputting image on the display device in time multiplex mode, according to the information of both left and right eyes' current 3D spatial positions acquired from the eye tracking module, the light containing the left eye image is outputted to the position of left eye instead of right eye at one time point, and the light containing the right eye image is outputted to the position of right eye instead of left eye at another time point.

The stereoscopic image display system and the method of controlling the same according to the present invention have a function of tracking the viewer's eyes, and can perform a synchronous control according to the 3D spatial positions of viewer's eyes and the 3D stereoscopic images to be displayed so as to send the specified images to the predetermined eyes respectively. Therefore, according to the present invention, viewer can watch the stereoscopic image without wearing additional specific glasses, so as to improve the viewer's stereoscopic image visual experience. Moreover, the viewer's eyes need not to be kept in a fixed position when they are tracked automatically, and the stereoscopic image display system and the method for controlling the same according to the present invention can adjust adaptively and can still send the specified images to the predetermined eyes in the case that the eye positions are changed, so as to enlarge the visual range of stereoscopic image compared to the prior art and achieve a better stereoscopic image visual experience for viewers.

Secondly, the stereoscopic image display system and the method for controlling the same according to the present invention can form the interleaved light source in time multiplex mode, so as to light off at part of the time and have relatively low energy loss.

In addition, the stereoscopic images from the stereoscopic image display system according to the present invention are generated under the action of both the interleaved image and interleaved light source that are controlled automatically by the control module, and the 2D display can be realized easily through the switchover of the control mode, so that it is compatible with 2D/3D display with good flexibility in image outputting modes.

DETAILED DESCRIPTION OF EMBODIMENTS

Hereinafter, the detailed description will be given to the embodiments of the present invention in combination with the attached drawings in order to make the above objects, features and advantages more apparent.

Figure 1:
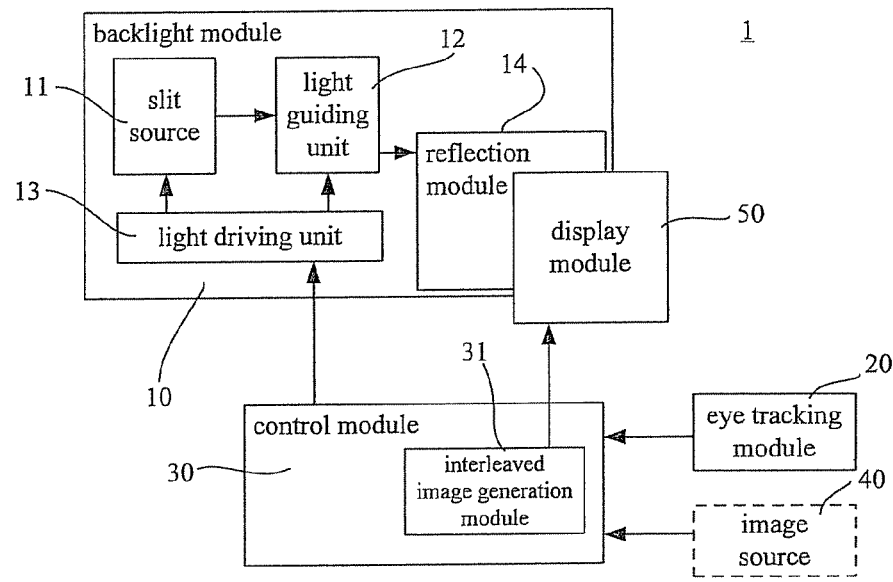
FIG. 1 is a schematic view for modules of a stereoscopic image display system according to one embodiment of the present invention.

FIG. 1 is a schematic view for modules of a stereoscopic image display system of one embodiment of the present invention. The stereoscopic image display system 1 comprises a backlight module 10, an eye tracking module 20, a control module 30 and a display module 50, as shown in FIG. 1. The backlight module 10 and the display module 50 constitute a display device that can alter the direction of the light outputted.

The backlight module 10 as a backlight source of the display module 50 is used for emitting the light to a back surface of the display module 50. The backlight module 10 further comprises a slit source 11, a light guiding unit 12, a light driving unit 13 and a reflection module 14.

The slit source 11 is used for generating linear light which is distributed in a slit region with its width far less than its length and is therefore called as "linear light" in this technical field as the slit region seems a line, and the "linear light" mentioned in the application just refers to such light that is distributed in a slit region. The slit source 11 includes a strip-like light source 111 and a converging lens 112 with reference to FIGS. 2a-2d. In the embodiments of the present invention, the strip-like light source 111 that is an LED light bar and the converging lens that is columnar are configured in parallel. According to one embodiment of the present invention, the strip-like light source can be substituted by a laser light source. The converging lens 112 converges light emitted from the LED light bar 111, and the emergent direction of the converged light can focus on a relatively small area such that the linear light from the slit source 11 can emit onto the light guiding unit 12 intensively.

The light guiding unit 12 is used for altering the direction of the emergent light from the slit source 11, and guiding the altered emergent light to the reflection module 14 to form a reflection region on thereof. In the embodiments of the present invention, the light guiding unit 12 includes a servo motor (not shown) with a revolving shaft having a prism column configured thereon. The principal optical axis of the prism column is parallel to the main shaft of the servo motor, and moreover, the lengthened line of the main shaft of the servo motor passes through the principal optical axis of the prism column. In the embodiments shown in FIGS. 2a-2d, the prism column is a quadrangular prism with square section, and has four prism faces laterally. The prism column is driven by the revolving shaft of the servo motor and rotates at the speed of 14400 r/s, which constantly alters the incident angle of the light emitted onto the prism faces relative to the prism faces so as to alter the direction of the emergent light. The light sweeps over the reflection module 14 continuously as it revolves. In other embodiments according to the present invention, the prism column can be substituted by other prisms having a function of altering light direction; in another embodiment of the present invention, it is certain that the prism column can also be substituted by reflectors or other optical elements for altering the light transmission direction.

The slit source 11 and the light guiding unit 12 are configured between the display module 50 and the reflection module 14, and located on the side of the display module 50.

The reflection module 14 reflects light, and when the light illuminates a certain region on the reflection module 14, this certain region reflects light and becomes a luminous region, while no light reflects on the rest region not illuminated which becomes a non-luminous region.

The light driving unit 13 is used for driving the slit source 11 and the light guiding unit 12 synchronously and respectively, and further includes a light source driver (not shown) and a motor driver (not shown). More specifically, the light source driver is used for driving the slit source 11 to perform the lighting on/off operations. The motor driver is used for driving the light guiding unit 12, and in this embodiment, the motor driver drives the servo motor of the light guiding unit 12, and controls the rotation of the servo motor. In the embodiments according to the present invention, the light source driver sends out pulse-width modulation (PWM) signal so as to light on the slit source 11 at some time points and light it off at another time points. The emergent direction of the slit source 11 is kept unchanged as the control module 30 controls the light guiding unit 12 and the slit source 11 synchronously, and the light guiding unit 12 constantly alters the to emergent direction of the slit source 11 such that the light emitted from the slit source 11, after guided by the light guiding unit 12, is moved on the reflection module 14 continuously. The slit source 11 is lighted on when it is moved to certain regions on the reflection module 14, such that said certain regions become luminous regions; while the slit source 11 is lighted off when it is moved to another regions on the reflection module 14, such that said another regions become non-luminous regions, so as to form an interleaved light source in time multiplex mode on the reflection module 14 where width-predetermined luminous regions and non-luminous regions are arrayed in an interleaved form.

The reflection module 14 is disposed in the rear of the display module 50 and emits the light entering the luminous region thereon to the display module 50 so as to provide a backlight source for the display module 50. Preferably, the reflection module 14 is a total reflection sheet with relatively high reflectivity such that the energy loss of light in the process of reflection can be reduced. The total reflection sheet can be planar or non-planar.

Referring to FIG. 1 still, the eye tracking module 20 is used for tracking the viewer's eyes (including both left and right eyes) to locate the eyes' current 3D spatial positions, generate and transmit the information of both left and right eyes' 3D spatial positions to the control module 30. More specifically, the eye tracking module 20 can be realized by using, for example, the already known Kalman filtering, particle filtering, infrared sensing and some known image processing techniques.

The control module 30 receives the information of both left and right eyes' current 3D spatial positions provided by the eye tracking module 20, then controls the backlight module 10 and the display module 50 synchronously. Specifically, the control module 30 controls the light driving unit 13 in the backlight module 10, and then the light driving unit further drives the slit source 11 and light guiding unit 12 respectively, to form an interleaved light source on the reflection module 14. The control module 30 can be realized by the known signal processing devices such as central processing unit (CPU), digital signal processor (DSP) and application specific integrated circuit (ASIC). The control module 30 comprises an interleaved image generation module 31. The control module 30 acquires and provides the source image information from the image source 40 to the interleaved image generation module 31. It is possible for the interleaved image generation module 31 to insert black vertical regions on each of the source image information according to different eye positions in the process of the interleaved image generation module 31 receiving the image sent to left or right eye, which the black vertical regions are substituted for part of regions in the original source image information and divides the original continuous source image information into the interleaved image signals consisting of image regions and black regions. The interleaved image generation module 31 provides the interleaved image signals generated to the display module 50.

The display module 50 is used for displaying images and uses the known LCD screen such as TFT-LCD (Thin Film Transistor Liquid Crystal Display) screen in one embodiment of the present invention. The display module 50 displays the interleaved image when receiving the interleaved image signals provided by the interleaved image generation module 31. The interleaved image includes black regions and image regions which are arrayed in an interleaved form. In accordance with the known liquid crystal display technique, the light can selectively pass through the image regions, rather than the black regions, on the display module 50, and the light passing through enters the eyes and generates a perceptible image. It is certain in the embodiments according to the present invention that the interleaved image generation module 31 and the control module 30 can be separately installed, as well as the interleaved image generation module 31 can be integrated in the display module 50, both of which operate similarly.

Figure 3:
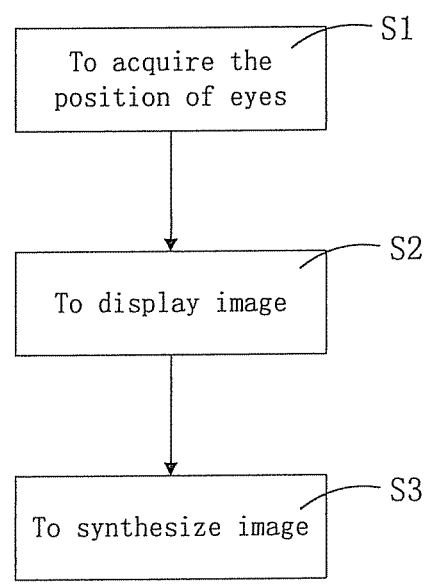
FIG. 3 is a flow chart of a method for controlling the stereoscopic image display system according to one embodiment of the present invention.

The method of controlling the stereoscopic image display system 1 according to one embodiment of the present invention comprises the steps illustrated in FIG. 3. Each of the steps will be described in detail as follows, and in the following descriptions the reference is still made to FIG. 1.

In step S1 of acquiring the eyes' positions, the eye tracking module 20 automatically tracks the viewer's eyes, locates the current 3D spatial positions of the viewer's eyes, and generates the information of both left and right eyes' 3D spatial positions.

In step S2 of displaying image, the control module 30 acquires from the image source 40 the information of the source image to be displayed, meanwhile figures out shape of the backlight source to be generated and information of the image to be generated according to the information of the current 3D spatial positions of viewer's eyes provided by the eye tracking module 20, then controls the backlight module 10 to form an interleaved light source and controls the display module 50 to generate the corresponding interleaved image synchronously. Under synchronous control of the control module, the interleaved light source and the interleaved image switch over alternately such that the left eye image and right eye image are sent to the left eye and right eye correspondingly and respectively. At the time point of sending left eye image, the lights from the luminous regions enter the left eye through the image regions of the interleaved image, but are blocked from entering the right eye by the black regions. At the time point of sending right eye image, the lights from the luminous regions enter the right eye through the image regions of the interleaved image, but are blocked from entering the left eye by the black regions. With these two time points alternating by turns, the light including left eye image is sent to the left eye rather than the right eye at the time point of sending left eye image and the light including right eye image is sent to the right eye rather than the left eye at the time point of sending right eye image, in time multiplex mode. It is possible to constantly perceive the corresponding synthetic images under the viewer's brain synthetic action on the images corresponding to and observed respectively by both eyes because of the eye's persistence of vision when these two time points switch fast enough.

FIGS. 2a-2d are schematic diagrams in sequence for the stereoscopic image display system 1 of one embodiment of the present invention at four time points of T1 to T4, and now the step S2 of displaying image will be described in detail according to one embodiment of the present invention in combination with FIGS. 2a-2d. According to the theory aforementioned, under the control of the control module 30, a first interleaved light source 141 is generated on the backlight module 14 and a first interleaved image 501 is displayed on the display module 50 at the time point of T1; a second interleaved light source 142 is generated on the backlight module 14 and a second interleaved image 502 is displayed on the display module 50 at the time point of T2; a third interleaved light source 143 is generated on the backlight module 14 and a third interleaved image 503 is displayed on the display module 50 at the time point of T3; and a fourth interleaved light source 144 is generated on the backlight module 14 and a fourth interleaved image 504 is displayed on the display module 50 at the time point of T4.

Figure 2A:
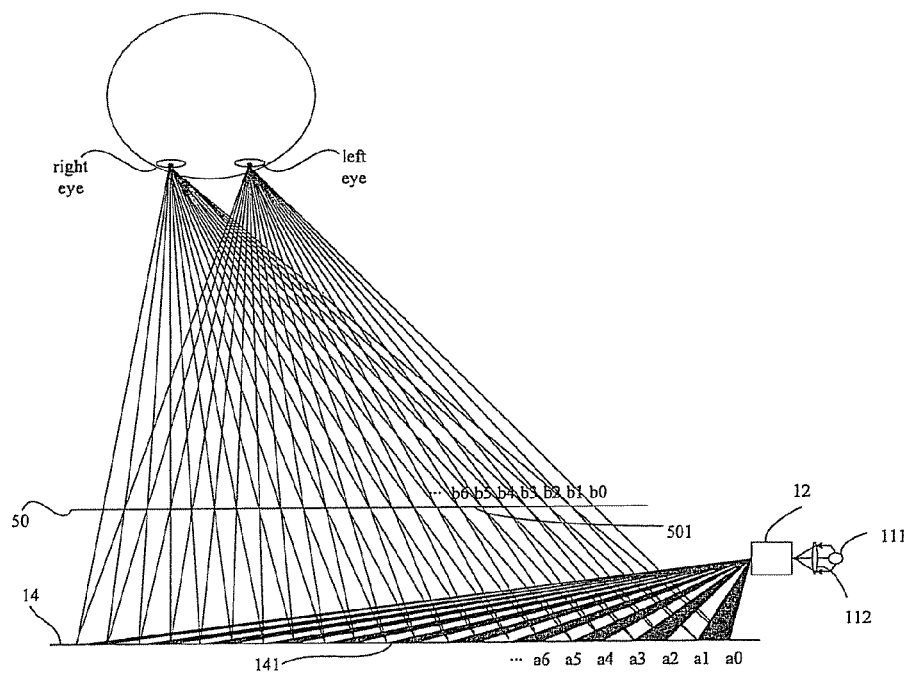
FIGS. 2a-2d are schematic diagrams for the stereoscopic image display system at four time points of T1-T4 according to one embodiment of the present invention.

FIG. 2a shows a schematic diagram for the stereoscopic image display system 1 at the time point of T1. At the time point of T1, the right eye image acquired from the image source 40 is sent to the right eye. At this time point, the interleaved image generation module 31 substitutes the black region computed according to the information of the eyes' 3D spatial positions for partial regions of the right eye image acquired, and the other regions not substituted by the black regions are image regions, so as to generate the display signal of the first interleaved image 501. The display module 50 receives the display signal and generates the first interleaved image 501 including alternate light-tight black regions b0b1, b2b3, b4b5 etc. and image regions b1b2, b3b4, b5b6 etc. Meanwhile, the backlight module 10 generates the first interleaved light source 141 computed according to the information of eye's 3D spatial positions on the reflection module 14 based on the aforementioned operating principle. The first interleaved light source 141 includes luminous regions a0a1, a2a3, a4a5 etc. that reflect light and non-luminous regions a1a2, a3a4, a5a6 etc. As shown in the figure, the reference numerals b0, b1, b2, b3 ... on the display module 50 indicate points of intersection between the black regions and the image regions, and the reference numerals a0, a1, a2, a3 ... on the reflection module 14 indicate points of intersection between the non-luminous regions and the luminous regions; moreover, as a result of the auto-computation and control of the control module 30, the left eye, b0 and a0 are aligned and the right eye, b1 and a0 are aligned; the left eye, b1 and a1 are aligned and the right eye, b2 and a1 are aligned ..., and so on. The backlight module 10 provides the first interleaved light source 141 as the backlight source for the display module 50, as mentioned above, the luminous regions of the interleaved light source reflect light, while the non-luminous regions reflect no light; and the light can pass through the image regions selectively, rather than the black regions, on the display module 50 according to the known liquid crystal display technique.

The light emitted from the luminous region can pass through the image regions and then enter viewer's right eye based on light transmission and rectilinear propagation under the actions of both the first interleaved light source 141 and the first interleaved image 501, but are blocked from entering viewer's left eye by the black regions; and no light will pass through the image regions from the non-luminous regions and enter the left eye since the image regions are exactly located between the left eye and non-luminous regions. Therefore, at the time point of T1, only the right eye of viewer observes the first interleaved image 501 on the display module 50, but the left eye can not catch any image on the display module 50. At this time point, the right eye only observes the image of the above mentioned right eye image acquired from the image source and displayed on the image regions of the first interleaved image 501, and the image of the above mentioned right eye image acquired from the image source originally on the black regions of the first interleaved image 501 will not be sent out temporarily till the time point of T3 which will be illustrated below.

Figure 2B:
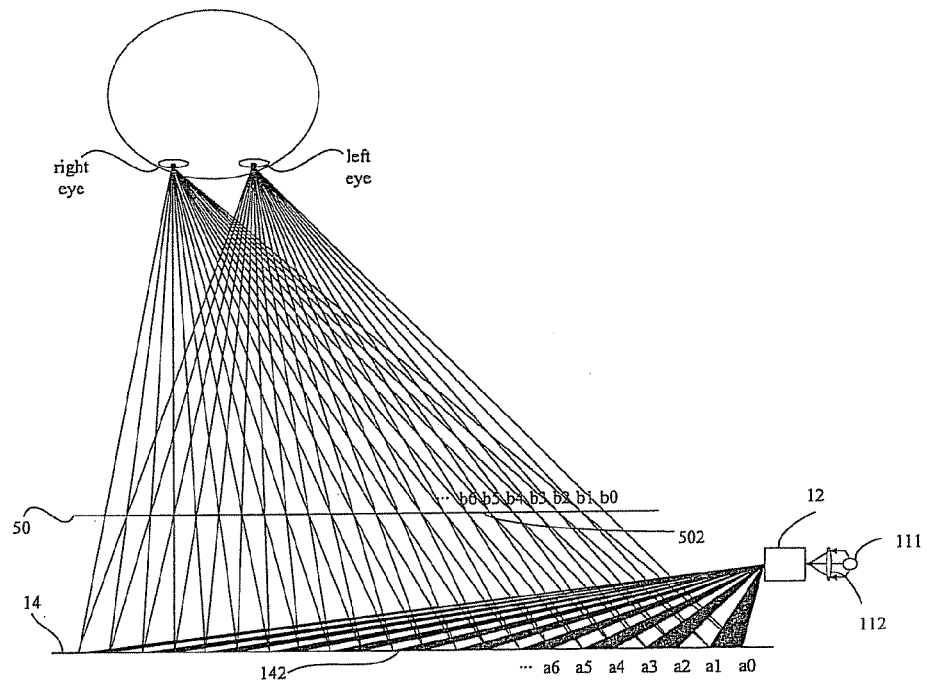

FIG. 2b shows a schematic diagram for the stereoscopic image display system 1 at the time point of T2 after the time point of T1. At the time point of T2, the left eye image acquired from the image source 40 is sent to the left eye. At this time point, to be displayed is the left eye image acquired from the image source 40, the position of the second interleaved light source 142 on the reflection module 14 is unchanged relative to the time point of T1, that is, the position of the second interleaved light source 142 is the same with that of the first interleaved light source 141 in the case that the eye's 3D spatial positions are unchanged; however, the position where the second interleaved image 502 generated on the display module 50 is displayed changes. At this time point, the second interleaved image 502 includes black regions b1b2, b3b4, b5b6 etc. and image regions b0b1, b2b3, b4b5 etc. In other words, the positions where image regions b0b1, b2b3, b4b5 etc. are displayed on the second interleaved image 502 are the positions where black regions are displayed at the time point of T1, and the positions where black regions b1b2, b3b4, b5b6 etc. are displayed on the second interleaved image 502 are the positions where image regions are displayed at the time point of T1.

Similar to the time point of T1, at the time point of T2, only the viewer's left eye observes the second interleaved image 502 on the display module 50 based on light transmission and rectilinear propagation under the actions of both the second interleaved light source 142 and the second interleaved image 502, but the right eye of viewer can not catch any image on the display module 50. At this time point, the left eye only observes the image of the above mentioned left eye image acquired from the image source and displayed on the image regions of the second interleaved image 502, and the image of the above mentioned left eye image acquired from the image source originally on the black regions of the second interleaved image 502 will not be sent out temporarily till the time point of T4 which will be illustrated below.

Figure 2C:
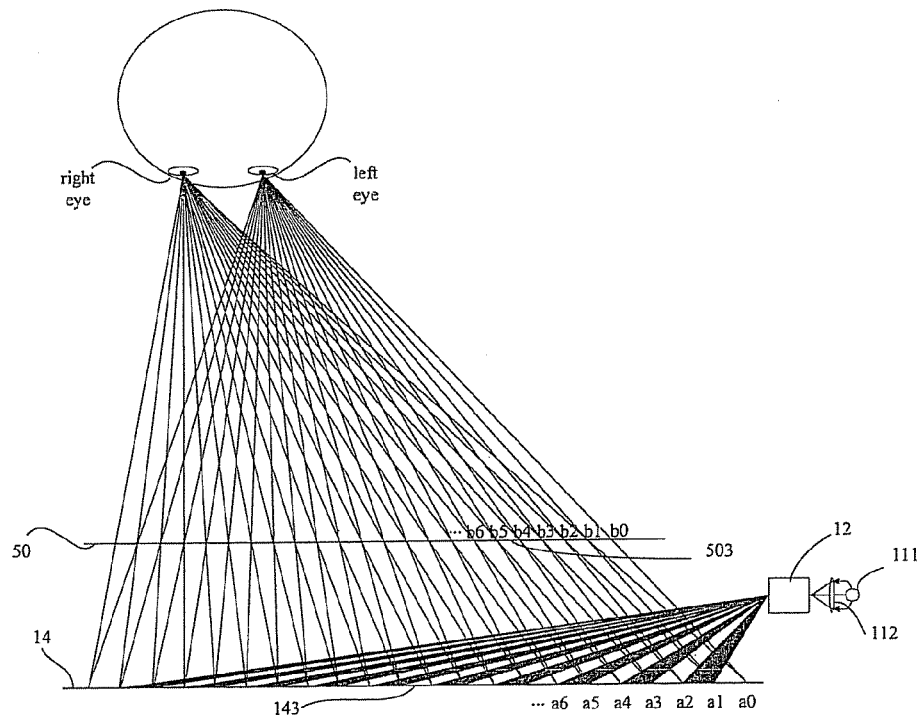

FIG. 2c shows a schematic diagram for the stereoscopic image display system 1 at the time point of T3 after the time point of T2. At the time point of T3, the part of the right eye image acquired from the image source 40 that is not displayed at the time point of T1 is sent to the right eye. At this time point, the position of the third interleaved light source 143 on the reflection module 14 changes relative to the time point of T2 in the case that the eye's 3D spatial positions are unchanged; however, the position where the third interleaved image 503 generated on the display module 50 is displayed is unchanged relative to the time point of T2. At this time point, the third interleaved light source 143 includes luminous regions a1a2, a3a4, a5a6 etc. and non-luminous regions a0a1, a2a3, a4a5 etc. In other words, the positions of the luminous regions a1a2, a3a4, a5a6 . . . on the third interleaved light source 143 are the positions of the non-luminous regions at the time point of T2, and the positions of the non-luminous regions a0a1, a2a3, a4a5 . . . on the third interleaved light source 143 are the positions of the luminous regions at the time point of T2.

Similar to the time points of T1 and T2, at the time point of T3, only the viewer's right eye observes the third interleaved image 503 on the display module 50 based on light transmission and rectilinear propagation under the actions of both the third interleaved light source 143 and the third interleaved image 503, but the viewer's left eye can not catch any image on the display module 50. More specifically, the positions where the image regions of the third interleaved image 503 observed by the right eye at the time point of T3 are displayed are complementary to the positions where the image regions of the first interleaved image 501 observed by the right eye at the time point of T1 are displayed. Therefore, the first interleaved image 501 observed by the right eye at the time point of T1 and the third interleaved image 503 observed at the time point of T3 constitute a complete right eye image via the time points of T1 and T3. As a result, the full precision display of the right eye image is realized. It is noted that the positions of the image regions and the black regions of the third interleaved image 503 may change relative to the complementary positions of the first interleaved image 501 if the 3D spatial positions of viewer's eye change at the time point of T3 compared to the time point of T1, but the displacement of viewer in a very short period is tiny since the images switch over very fast, for example, at the rate of no less than 1/120 of a second (i.e. no less than 120 Hz), and the change of image position according to adjustment of the 3D spatial positions of viewer's eye is also generally tiny, which is still regarded as complementary for human's eyes. As a result, it is regarded that the eye observes a full precision right eye image via the time points of T1 and T3.

Figure 2D:
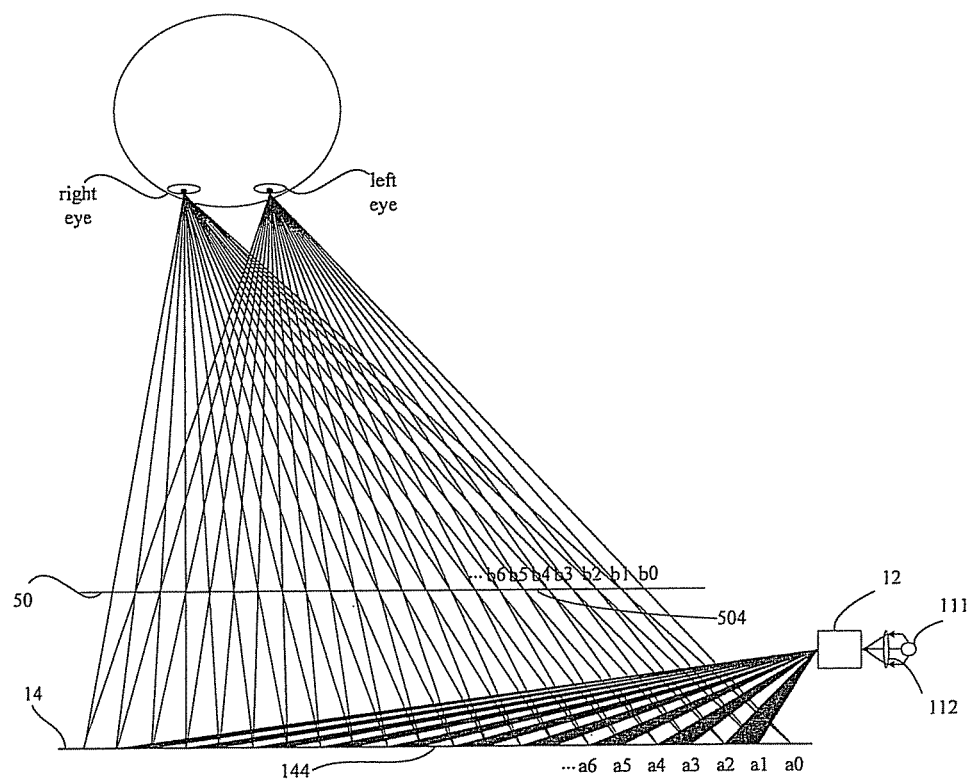

FIG. 2d shows a schematic diagram for the stereoscopic image display system 1 at the time point of T4 after the time point of T3. At the time point of T4, the part of the left eye image acquired from the image source 40 that is not displayed at the time point of T2 is sent to the left eye. At this time point, the position of the fourth interleaved light source 144 on the reflection module 14 is unchanged relative to the time point of T3, that is, the position of the fourth interleaved light source 144 is the same with that of the third interleaved light source 143 in the case that the eye's 3D spatial positions are unchanged; however, the position where the fourth interleaved image 504 generated on the display module 50 is displayed changes. At this time point, the fourth interleaved image 504 includes black regions b0b1, b2b3, b4b5 etc. and image regions b1b2, b3b4, b5b6 etc. In other words, the positions where image regions b1b2, b3b4, b5b6 etc. are displayed on the fourth interleaved image 504 are the positions where the black regions are displayed at the time points of T2 and T3, and the positions where black regions b0b1, b2b3, b4b5 etc. are displayed on the fourth interleaved image 504 are the positions where the image regions are displayed at the time points of T2 and T3.

Similar to the time points of T1, T2 and T3, at the time point of T4, only the viewer's left eye observes the fourth interleaved image 504 on the display module 50 based on light transmission and rectilinear propagation under the actions of both the fourth interleaved light source 144 and the fourth interleaved image 504, but the viewer's right eye can not catch any image on the display module 50. More specifically, the positions where the image regions of the fourth interleaved image 504 observed by the left eye at the time point of T4 are displayed are complementary to the positions where the image regions of the second interleaved image 502 observed by the left eye at the time point of T2 are displayed. Therefore, the second interleaved image 502 observed by the left eye at the time point of T2 and the fourth interleaved image 504 observed at the time point of T4 constitute a complete left eye image via the time points of T2 and T4. As a result, the full precision display of the left eye image is realized. Likewise, the positions of the image regions and black regions of the fourth interleaved image 504 may change relative to the complementary positions of the second interleaved image 502 if the 3D spatial positions of viewer's eyes change at the time point of T4 compared to the time point of T2, but the displacement of the viewer in a very short period is tiny since the images switch over very fast, for example, at the rate of no less than 1/120 of a second (i.e. no less than 120 Hz), and the change of image position according to adjustment of the 3D spatial position of viewer's eye is also generally tiny, which is still regarded as complementary for human's eyes. As a result, it is regarded that the eye still observes a full precision left eye image via the time points of T2 and T4.

From the above, the right eye observes a complete right eye image via the time points of T1 and T3, and the left eye observes a complete left eye image via the time points of T2 and T4.

In step S3 of synthesizing image, the left and right eye images generated according to the stereoscopic parallax effect based on the known parallax theory form a stereoscopic image with stereoscopic effect under the viewer's brain synthetic action. In other words, the viewer perceives a complete stereoscopic image via the four time points from T1 to T4. According to the present invention, the refreshing rate for the display module displaying image is preferably no less than 120 Hz, i.e. the time value (the so-called time value is defined as the time interval between the adjacent two time points) for each of the four time points from T1 to T4 is equal and no more than $1/120$ of a second, and the viewer can perceive a complete stereoscopic image via the time period no more than $1/30$ of a second (based on $(1/120)4=1/30$). It is difficult to perceive switchover of images but instead constantly displaying images are observed when images refresh rapidly because of persistence of vision (normally, human's eye can not perceive the flicker on switchover of images if the time interval is less than 0.03 seconds). More preferably, the refreshing rate for the display module displaying image is no less than 240 Hz, i.e. the time value for each of the four time points from T1 to T4 is equal and no more than $1/240$ of a second, and the viewer can perceive a complete stereoscopic image via the time period no more than $1/60$ of a second (based on $(1/240)4=1/60$). It can better reduce the visual flicker of the eyes and release the visual fatigue when the refreshing rate of the complete stereoscopic image presented to viewers is more than 60 Hz.

From the above descriptions, it is also known that the positions where the images are displayed at the time points of T4 and T1 are the same, but the images enter different eyes respectively; the positions where the images are displayed at the time points of T2 and T3 are the same, but the images enter different eyes respectively. Therefore, according to another embodiment of the present invention, it can circulate between the two time points continuously instead of the four time points. For example, it can circulate only between the time points of T2 and T3, or only between the time points of T4 and T1. It can display a stereoscopic image with interleaved black regions between every two adjacent time points according to the known parallax theory. It can still display an image with stereoscopic effect when the width of black regions is too small to perceive by eyes, but only the resolution of image reduces by half compared to that observed by the viewer in the above mentioned embodiment of circulation between four time points.

The above embodiment is explained by using an example that the position where the image is displayed at the time point of T2 firstly changes relative to the time point of T1. Certainly, the invention is not limitative but can be realized by firstly changing the position of the interleaved light source in another embodiment of the present invention. For example, the interleaved image and interleaved light source as illustrated in FIG. 2a are generated synchronously at the time point of T1, and the right eye observes the first interleaved image 501 on the display module 50; the interleaved image and interleaved light source as illustrated in FIG. 2d are generated synchronously at the time point of T2, and the left eye observes the fourth interleaved image 504 on the display module 50; the interleaved image and interleaved light source as illustrated in FIG. 2c are generated synchronously at the time point of T3, and the right eye observes the third interleaved image 503 displayed in the position complementary to that at the time point of T1 on the display module 50; the interleaved image and interleaved light source as illustrated in FIG. 2b are generated synchronously at the time point of T4, and the left eye observes the second interleaved image 502 displayed in the position complementary to that at the time point of T2 on the display module 50. A full precision stereoscopic image of a complete image consisting of a first interleaved image 501, a second interleaved image 502, a third interleaved image 504 and a fourth interleaved image 504 is perceived under human brain's synthetic action through the time points from T1 to T4.

Moreover, the stereoscopic image display system 1 of the present invention is not limited to the right eye firstly observing the interleaved image on the display module 50 and then the left eye alternately observing the interleaved image on the display module 50, and of course, in the stereoscopic image display system of the present invention, it is also possible for the left eye to firstly observe the interleaved image on the display module 50 and then the right eye to alternately observe the interleaved image on the display module 50, both of which operate substantially the same and therefore will not be further described herein.

In the stereoscopic image display system 1 of the present invention, the eye tracking module 20 can automatically track the viewer's eyes and generate the information of eye's current 3D spatial positions when the viewer's position changes, i.e. the 3D spatial positions of the viewer's both left and right eyes change. The control module calculates based on the known optics and geometry theories and according to both eyes' positions and whether the image displayed is used for the left or right eye, and acquires the interleaved image and interleaved light source in suitable size and position corresponding to each time point, and it allows the corresponding interleaved image and interleaved light source generated to work synchronously under the synchronous control of the control module 30 to the backlight module 10 and the display module 50, so as to realize automatic stereoscopic display of image. Therefore, the stereoscopic image display system 1 of the present invention automatically responses and adjusts the size and position of the interleaved image and the interleaved light source, allowing both the left and right eye images to real-time output to the corresponding eyes respectively once the eyes' positions change. Therefore, the present invention can enlarge the visual range of stereoscopic image without the need for the viewer's eyes being kept in a fixed position and provide the viewer a better visual experience. And according to the present invention, it is possible for the viewer watching the stereoscopic image without wearing additional specific glasses so as to further improve the viewer's stereoscopic image visual experience. According to a selective control mode of the present invention, it can be manually configured to a "static" mode when the viewer needs not to move, and at this time, it is required for one-time adjustment instead of real-time automatic eye-tracking, and it is not required to compute and adjust at the time point of outputting each image, so as to increase the computing i.e. operating efficiency of the system.

The interleaved light source comprises a plurality of strips extending longitudinally whose longitudinal direction is preferably the vertical direction of the display module 50. The vertical direction of the display module 50 mentioned herein generally refers to the direction perpendicular to the line between both eyes of the viewer since the line between both eyes of the viewer is horizontal in normal condition (or in average condition). It is certain that the line between both eyes of the viewer can not always be kept perpendicular to the vertical direction of the display module 50, but the stereoscopic image can still be perceived as long as it is not in parallel to the vertical direction of the display module 50. Moreover, although the display panel of the display module shown in the figure is planar, the present invention is not limited to the planar shape. The width of strip of the interleaved light source is equal or unequal according to eyes' actual 3D spatial positions and different shapes of the display panel.

In addition, the control module easily switches over since the interleaved image and interleaved light source are controlled by the control module automatically, and the output mode for the images of the present invention is very flexible. The stereoscopic image display system of the present invention can realize the switchover of 2D/3D display modes. In another embodiment of the present invention, when it is switched to 2D display mode, the control module 10 controls the light driving unit 13 in the backlight module 10, further the light source driver in the light driving unit 13 drive the LED light bar 111 of the slit source 11 to be constantly on; and the interleaved image generation module 31 will not insert black regions in the image information acquired from the image source 40. At this time, the left and right eyes of the viewer can observe the same image displayed on the display module 50 at the same time point and the image displayed is a 2D image, so as to realize the 2D display. Therefore, the stereoscopic image display system 1 of the present invention is compatible with both 2D and 3D displays. In 2D display mode, the switchover rate of image can be reduced to no less than 60 Hz while the eyes of viewer can still enjoy with good visual effect.

In the stereoscopic display system 1 of the present invention, the LED light bar 111 in the slit source 11 is only lighted on for half of the region on the reflection module 14 and is off for the other half of the region at the time points of T1-T4. Therefore, the luminous energy loss of the stereoscopic display system 1 of the present invention is only about ½, and the traditional technique that realizes the stereoscopic image display, for example, through Shutter requires the backlight source to be constantly on, as a result, the energy loss of the stereoscopic image display system 1 of the present invention is lower compared to the traditional technique that realizes the stereoscopic image display.

Although the present invention is disclosed by preferable embodiments as above, but these embodiments are not intended to be limitative, and potential variations and modifications can be made by the ones skilled in the prior art without departing from the spirit and scope of the present invention, so the protective scope of the present invention should cover all as defined in the attached claims.

I claim:

1. A stereoscopic image display system comprising an eye tracking module, a control module, a backlight module and a display module, wherein
    said eye tracking module is used for locating current 3D spatial positions of viewer's eyes and generating the information of 3D spatial positions of both left and right eyes;
    said control module is used for controlling said backlight module and said display module synchronously according to the information of 3D spatial positions of said both left and right eyes provided by said eye tracking module;
    said backlight module comprises a slit source, a light guiding unit, a light driving unit and a reflection module, and wherein said slit source and said light guiding unit are configured between the display module and the reflection module, and located on the side of the display module; said slit source is used for emitting linear light to said light guiding unit; said light guiding unit is used for altering the direction of the emergent light from said slit source and guiding the emergent light altered to said reflection module; and said light driving unit is used for driving said slit source and said light guiding unit respectively, said light driving unit sends out pulse-width modulation(PWM) signal so as to light on the said slit source at some points and light it off at another time points; said backlight module is used for forming an interleaved light source under control of said control module, and emitting said interleaved light source to said display module as a backlight source, said interleaved light source including luminous regions where light emits to said display module and non-luminous regions where hardly any light emits to said display module, said luminous regions and non-luminous regions being arrayed in an interleaved form; and
    said display module is used for displaying an interleaved image under the control of said control module, said interleaved image including black regions where light can't pass through and image regions where light can pass through, said black regions and image regions being arrayed in an interleaved form.

2. The stereoscopic image display system as set forth in claim 1, wherein said slit source comprises a strip-like light source and a converging lens that are configured in parallel to each other.

3. The stereoscopic image display system as set forth in claim 2, wherein said strip-like light source is selected from either of an LED light bar and a laser light source.

4. The stereoscopic image display system as set forth in claim 1, wherein said light guiding unit comprises a servo motor that has a revolving shaft and an optical element for alerting the direction of the emergent light from said slit source is configured on said revolving shaft.

5. The stereoscopic image display system as set forth in claim 4, wherein said optical element is a prism column or a reflector, which alters the incident angle of the linear light relative thereto through the rotation of the revolving shaft of said servo motor so as to alter the direction of the emergent light.

6. The stereoscopic image display system as set forth in claim 4, wherein said light driving unit comprises:
    a light source driver for driving said slit source so as to light it on/off, and
    a motor driver for driving said servo motor allowing for the revolving shaft on said servo motor to rotate said optical element so as to alter the incident angle of the light emitted from said slit source relative to said optical element.

7. The stereoscopic image display system as set forth in claim 1, wherein the refreshing rate for said display module displaying image is no less than 240 Hz.

8. The stereoscopic image display system as set forth in claim 1, wherein said reflection module is a total reflection sheet.

9. The stereoscopic image display system as set forth in claim 1, wherein said interleaved light source and said interleaved image alternately switch over between at least two time points under synchronous control of said control module, said two time points including a time point of outputting a left eye image where the light from said luminous regions enters the left eye through said image regions of the interleaved image and is blocked by said black regions from entering the right eye, and a time point of outputting a right eye image where the light from said luminous regions enters the right eye through said image regions of the interleaved image and is blocked by said black regions from entering said left eye, said two time points appearing alternately.

10. The stereoscopic image display system as set forth in claim 1, wherein the luminous regions and the non-luminous regions of said interleaved light source are arrayed alternately as stripes extending lengthwise whose lengthwise extension direction is a perpendicular direction of said display module.

11. A method of controlling the stereoscopic image display system, comprising:
  an eye tracking module locating current 3D spatial positions of viewer's eyes and generating the information of 3D spatial positions of both left and right eyes;
  a control module controlling a display device that can alter the direction of the light outputted, outputting images on the display device in time multiplex mode according to the information of both eyes' current 3D spatial positions acquired from said eye tracking module, wherein the light including the left eye image is outputted to the position of the left eye instead of the right eye at one time point and the light including the right eye image is outputted to the position of the right eye instead of the left eye at another time point;
  said outputting images in time multiplex mode comprises:
  said control module controlling the generation of interleaved light source on a backlight module of said display device, said interleaved light source including luminous regions where light emits to a display module of said display device and non-luminous regions where no light emits to the display module, said luminous regions and non-luminous regions being arrayed in an interleaved form;
  said control module controlling the generation of interleaved image on the display module, said interleaved image including black regions where light can't pass through and image regions where light can pass through, said black regions and image regions being arrayed in an interleaved form; wherein
  said control module calculates the predetermined size and position of the interleaved light source and interleaved image according to said information of both left and right eyes' current 3D spatial positions acquired and the positions of the backlight module and the display module, said backlight module and said display module respectively generates the interleaved light source and the interleaved image in predetermined size and position under the synchronous control of said control module, the light from said luminous regions enters said left eye through images regions of the interleaved image but is blocked by said black regions from entering the right eye at the time of outputting the left eye image; and
  the light from said luminous regions enters said right eye through images regions of the interleaved image but is blocked by said black regions from entering the left eye at the time of outputting the right eye image.

12. The method as set forth in claim 11, wherein the time points of outputting the left eye image and of outputting the right eye image switch over alternately.

13. The method as set forth in claim 11, wherein said control module generating the interleaved light source on the backlight module in time multiplex mode comprises: controlling the slit source and the light guiding unit of said backlight module synchronously, the emergent direction of the slit source being kept unchanged under the synchronous control of said control module, the light guiding unit constantly altering the emergent direction of the slit source such that the light emitted from the slit source, after guided by the light guiding unit, is continuously moved on the reflection module, and wherein
  said slit source is lighted on when it is moved to a certain region on the reflection module such that said certain region becomes a luminous region; said slit source is lighted off when it is moved to another region on the reflection module such that said another region becomes non-luminous region, so as to generate said interleaved light source.

14. The method as set forth in claim 11, wherein said control module controlling the generation of interleaved image on the display module comprises: said control module acquiring the source image from the image source and substituting a black region for a certain region on said source image.

15. The method as set forth in claim 14, wherein said time points of outputting the left eye image include a first time point and a second time point, the position of the image regions of said interleaved image at the second time point being substantially that of the black regions at the first time point; and said time points of outputting the right eye image includes a third time point and a fourth time point, the position of the image regions of said interleaved image at the fourth time point being substantially that of the black regions at the third time point.

16. The method as set forth in claim 15, wherein said outputting images in time multiplex mode circularly switches over in a predetermined sequence from one of the first and second time points, to one of the third and fourth time points, to another of the first and second time points, and to another of the third and fourth time points; or in a predetermined sequence from one of the third and fourth time points, to one of the first and second time points, to another of the third and fourth time points, and to another of the first and second time points.

17. The method as set forth in claim 11, wherein said control module will recalculate the predetermined size and position of the interleaved light source and the interleaved image if said information of both left and right eyes' current 3D spatial positions when outputting the image at each time point changes relative to the information when outputting the image at the former time point.

18. The method as set forth in claim 16, wherein the time value of said predetermined time point is no more than $1/240$ of a second.

* * * * *